US010487796B2

(12) United States Patent
Tobin et al.

(10) Patent No.: US 10,487,796 B2
(45) Date of Patent: Nov. 26, 2019

(54) ATTACHMENT METHODS FOR SURFACE FEATURES OF WIND TURBINE ROTOR BLADES

(71) Applicant: General Electric Company, Schenectady, NY (US)

(72) Inventors: James Robert Tobin, Simpsonville, SC (US); Murray Fisher, Greer, SC (US); Madireddi Vasu Datta, Bangalore (IN); Drew Adam Wetzel, Easley, SC (US)

(73) Assignee: General Electric Company, Schenectady, NY (US)

( * ) Notice: Subject to any disclaimer, the term of this patent is extended or adjusted under 35 U.S.C. 154(b) by 341 days.

(21) Appl. No.: 15/292,262

(22) Filed: Oct. 13, 2016

(65) Prior Publication Data

US 2018/0106237 A1    Apr. 19, 2018

(51) Int. Cl.
| F03D 1/06 | (2006.01) |
| B29C 70/84 | (2006.01) |
| B29C 70/74 | (2006.01) |
| F03D 13/10 | (2016.01) |

(52) U.S. Cl.
CPC .......... *F03D 1/0633* (2013.01); *B29C 70/747* (2013.01); *B29C 70/84* (2013.01); *F03D 1/0675* (2013.01); *F03D 13/10* (2016.05); *F05B 2230/60* (2013.01); *F05B 2240/30* (2013.01); *F05D 2230/60* (2013.01); *Y02E 10/721* (2013.01); *Y02P 70/523* (2015.11)

(58) Field of Classification Search
CPC ..... B29C 70/747; B29C 70/84; F03D 1/0675; F03D 1/0633; F05B 2230/60; F05B 2240/30; F05D 2230/60
See application file for complete search history.

(56) References Cited

U.S. PATENT DOCUMENTS

| RE19,412 E | 1/1935 | Zaparka |
| 2,450,440 A | 10/1948 | Mills |
| 3,528,753 A | 9/1970 | Dutton et al. |
| 3,586,460 A | 6/1971 | Toner |
| 4,136,460 A | 1/1979 | Cornwall |
| 4,329,119 A | 5/1982 | Baskin |
| 4,354,648 A | 10/1982 | Schenk et al. |
| 4,360,871 A | 11/1982 | Blaney |

(Continued)

FOREIGN PATENT DOCUMENTS

| DE | 102012000431 A1 | 7/2013 |
| EP | 0947693 | 10/1999 |

(Continued)

OTHER PUBLICATIONS

Samsung Wind Turbine 2.5MW Brochure, www.shi.Samsung.co.kr.

(Continued)

*Primary Examiner* — Moshe Wilensky
(74) *Attorney, Agent, or Firm* — Dority & Manning, P.A.

(57) ABSTRACT

The present disclosure is directed to methods for attaching a plurality of surface features to a rotor blade of a wind turbine. Such methods may include direct molding of the surface features to the rotor blade, bonding arrays of connected components to the rotor blade and subsequently removing connections between components, as well as using a flexible template with or without a tinted adhesive.

6 Claims, 12 Drawing Sheets

(56) References Cited

U.S. PATENT DOCUMENTS

| | | |
|---|---|---|
| 4,626,172 A | 12/1986 | Mouille et al. |
| 5,088,665 A | 2/1992 | Vijgen et al. |
| 5,346,367 A | 9/1994 | Doolin et al. |
| 6,105,904 A | 8/2000 | Lisy et al. |
| 6,540,288 B1 | 4/2003 | Tobin |
| 6,837,465 B2 | 1/2005 | Lisy et al. |
| 7,059,833 B2 | 6/2006 | Stiesdal et al. |
| 7,416,363 B2 | 8/2008 | Kozhuev |
| 7,458,777 B2 | 12/2008 | Herr |
| 7,585,157 B2 | 9/2009 | Quell et al. |
| 7,637,721 B2 | 12/2009 | Driver et al. |
| 7,878,457 B2 | 2/2011 | Narramore |
| 7,909,576 B1 | 3/2011 | van der Bos et al. |
| 7,914,259 B2 | 3/2011 | Godsk |
| 7,927,070 B2 | 4/2011 | Godsk |
| 7,976,276 B2 | 7/2011 | Riddell et al. |
| 8,038,396 B2 | 10/2011 | Anjuri et al. |
| 8,047,801 B2 | 11/2011 | Fang et al. |
| 8,047,804 B2 | 11/2011 | Bagepalli |
| 8,162,590 B2 | 4/2012 | Haag |
| 2007/0065290 A1 | 3/2007 | Herr |
| 2007/0077150 A1 | 4/2007 | Llorente Gonzalez |
| 2008/0175711 A1 | 7/2008 | Godsk |
| 2008/0317600 A1 | 12/2008 | Enevoldsen et al. |
| 2009/0068018 A1 | 3/2009 | Corten |
| 2009/0074585 A1 | 3/2009 | Koegler et al. |
| 2009/0084932 A1 | 4/2009 | Livingston |
| 2009/0087314 A1 | 4/2009 | Haag |
| 2010/0143144 A1 | 6/2010 | Anjuri et al. |
| 2010/0296940 A1 | 11/2010 | Zuteck |
| 2010/0296941 A1 | 11/2010 | Zuteck |
| 2011/0008174 A1 | 1/2011 | Ireland |
| 2011/0036482 A1 | 2/2011 | Stenbaek |
| 2011/0100540 A1 | 5/2011 | Mathew |
| 2011/0142628 A1 | 6/2011 | Xiong |
| 2011/0142635 A1 | 6/2011 | Frizt |
| 2011/0142637 A1 | 6/2011 | Riddell et al. |
| 2011/0142665 A1 | 6/2011 | Huck |
| 2011/0142668 A1 | 6/2011 | Rao |
| 2011/0142673 A1 | 6/2011 | Fang et al. |
| 2011/0268558 A1 | 11/2011 | Driver |
| 2012/0027590 A1 | 2/2012 | Bonnet |
| 2012/0134817 A1 | 5/2012 | Bagepalli et al. |
| 2012/0141269 A1 | 6/2012 | Giguere et al. |
| 2012/0151769 A1* | 6/2012 | Brake .................. F03D 1/0608 29/889.71 |
| 2012/0201690 A1 | 8/2012 | Fugisang |
| 2012/0257977 A1 | 10/2012 | Jensen et al. |
| 2012/0257978 A1 | 10/2012 | Jensen |
| 2012/0282105 A1 | 11/2012 | Grife et al. |
| 2013/0045105 A1 | 2/2013 | Driver et al. |
| 2013/0156593 A1 | 6/2013 | Gupta |
| 2014/0072440 A1 | 3/2014 | Jacobsen et al. |
| 2014/0328687 A1 | 11/2014 | Tobin et al. |
| 2014/0328692 A1 | 11/2014 | Riddell et al. |
| 2014/0334938 A1 | 11/2014 | Riddell et al. |
| 2015/0167474 A1* | 6/2015 | Tobin .................. F03D 1/0675 416/229 R |

FOREIGN PATENT DOCUMENTS

| | | |
|---|---|---|
| EP | 1674723 | 6/2006 |
| EP | 1944505 | 7/2008 |
| EP | 2098721 | 9/2009 |
| EP | 2444658 A1 | 4/2012 |
| EP | 2484895 A1 | 8/2012 |
| EP | 2532510 A1 | 12/2012 |
| EP | 2548801 A1 | 1/2013 |
| WO | WO 00/15961 | 3/2000 |
| WO | WO 2001/016482 | 3/2001 |
| WO | WO 2007/140771 | 12/2007 |
| WO | WO2008/113349 A2 | 9/2008 |
| WO | WO 2008/113350 | 9/2008 |
| WO | WO 2013/060722 A1 | 5/2013 |
| WO | WO 2014/202689 A1 | 12/2014 |
| WO | WO2016/020431 A1 | 2/2016 |

OTHER PUBLICATIONS

European Search Report of EP Application No. 14166768.3 dated Dec. 18, 2014.
European Search Report of EP Application No. 14165651.2 dated Sep. 19, 2014.
European Search Report of EP Application No. 14166104.1 dated Oct. 1, 2014.

* cited by examiner

ATTACHMENT METHODS FOR SURFACE FEATURES OF WIND TURBINE ROTOR BLADES

FIELD OF THE INVENTION

The present disclosure relates in general to wind turbine rotor blades, and more particularly to attachment methods for surface features for wind turbine rotor blades.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

In many cases, accessory components are attached to the rotor blades of wind turbines to perform various functions during operation of the wind turbine. For example, it is known to change the aerodynamic characteristics of wind turbine rotor blades by adding protrusions or other structures (often referred to as "vortex generators") to the surface of the blade in order to increase the energy conversion efficiency during normal operation of the wind turbine by increasing the lift force of the blades while decreasing the drag force. Vortex generators serve to increase the attached-flow region and to reduce the detached-flow region by moving flow separation nearer the trailing edge of the blade. In particular, vortex generators create local regions of turbulent airflow over the surface of the blade as a means to prolong flow separation and thus optimize aerodynamic airflow around the blade contour. Conventional vortex generators are defined as "fins" or shaped structures on the suction side of the turbine blade. More specifically, many vortex generators include a flange portion with the fin extending therefrom. Further surface features may also include boundary layer energizers that are commonly used to reduce the effect of a stall or a high angle of attack.

The curvature of the blade surface that such surface features attach to changes, which may require custom tooling and parts to fit every individual location on the rotor blade. Further, many surface features define a "step" at an interface between a flange portion thereof and the surface of the rotor blade. In addition, installation techniques and systems for attaching conventional surface features can be quite expensive and time consuming, particularly for field installations. For example, typical field installation techniques require the use of attachment fixtures and significant dwell time for curing the attachment adhesives. The adhesives typically are considered hazardous materials and appropriate precautions and protective measures (both equipment and personal) must be taken. Further, for particularly small surface features, locating a plurality of such features on a blade surface can be time consuming and tedious.

Thus, improved methods for attaching such surface features to wind turbine rotor blades would be welcomed in the art.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for forming and attaching a plurality of surface features onto a rotor blade of a wind turbine. The method includes locating a mold of the plurality of surface features at a desired location on either of a suction side or a pressure side of the rotor blade. Further, the mold forms a plurality of cavities with either of the suction side or the pressure side of the rotor blade when mounted thereto. As such, the method also includes filling the plurality of cavities with one or more materials so as to form the plurality of surface features thereon. In addition, the method includes curing and attaching the plurality of surface features so as to adhere to either of the suction side or the pressure side of the rotor blade. Moreover, the method includes removing the mold from either of the suction side or the pressure side of the rotor blade.

In one embodiment, each of the cavities includes at least one opening. In such embodiments, the step of filling the plurality of cavities with the one or more materials so as to form the plurality of surface features may include separately placing the one or more materials into each of the openings. In certain embodiments, the one or more materials may include a thermoset material, a thermoplastic material, rubber, a reinforcement material, a putty, or combinations thereof. More specifically, the material(s) may include any compound of two or more liquid- and/or putty-based thermoset compounds. In addition, the one or more materials may include one or more fillers (such as glass fiber). In a particular embodiment, for example, the material may be epoxy. Further, the reinforcement material(s) may comprise one or more fiber materials including but not limited to glass fibers, carbon fibers, polymer fibers, ceramic fibers, nanofibers, metal fibers, or similar.

In another embodiment, the method may include applying pressure to the mold after filling the plurality of cavities with the one or more materials so as to squeeze out excess one or more materials and removing the excess one or more materials before curing the plurality of surface features. Alternatively, the method may include applying pressure to the mold before and/or during filling of the plurality of cavities so as to prevent excess material from squeezing out of the cavities.

In alternative embodiments, the step of filling the plurality of cavities with the one or more materials so as to form the plurality of surface features may include injecting the one or more materials into a first side of the mold via at least one of vacuum infusion or pressure injection and allowing the one or more materials to flow into each of the plurality of cavities.

In additional embodiments, the method may include removing excess cured material, e.g. between the cured surface features.

In yet another embodiment, the mold may be constructed of a flexible material. For example, in certain embodiments, the flexible material of the mold may include rubber, silicone, or combinations thereof.

In another aspect, the present disclosure is directed to a method for attaching a plurality of surface features to a rotor blade of a wind turbine. The method includes forming a single blade add-on component containing the plurality of surface features connected to each other via a removable connector. Further, the single blade add-on component may include a curvature that corresponds to a curvature of the rotor blade. As such, the method further includes locating the single blade add-on component at a desired location on either of the suction side or the pressure side of the rotor blade. The method also includes applying an attachment layer between a blade-side surface of each of the plurality of surface features and either of the suction side or the pressure side. In addition, the method includes securing the single blade add-on component at the desired location.

In one embodiment, the method includes forming the single blade add-on component containing the surface features from a thermoset material. In another embodiment, the method may include forming the single blade add-on component via at least one of injection molding, three-dimensional (3D) printing, vacuum infusion, thermoforming, vacuum forming, or any other suitable manufacturing method.

In further embodiments, the step of securing the single blade add-on component at the desired location may further include applying pressure to each of the surface features so as to allow the attachment layer(s) to bond to the rotor blade.

In additional embodiments, the method may include removing one or more of the removable connectors from between the plurality of surface features after securing the single blade add-on component at the desired location.

In yet another embodiment, the attachment layer may include double-side tape having an inner acrylic foam layer disposed between a first outer adhesive layer and a second outer adhesive layer. As such, in certain embodiments, the step of applying the attachment layer between the blade-side surface of each of the plurality of surface features and either of the suction side or the pressure side may include cutting a predetermined pattern into the double-sided tape through the first and second outer adhesive layers, a first liner cover adjacent to the first outer adhesive layer, and a second liner cover adjacent to the second outer adhesive layer, selectively removing cut portions of the first liner cover and the second liner cover corresponding to the predetermined pattern to expose portions of the first and second outer adhesive layers, securing the exposed portions of the second outer adhesive layer to either of the suction side or the pressure side, wherein the exposed portions of the first outer adhesive layer are located at the desired location, and removing remaining portions of the first and second outer adhesive liners and the first and second liner covers.

In yet another aspect, the present disclosure is directed to a method for attaching a plurality of surface features to a rotor blade of a wind turbine. The method includes locating a flexible template at a desired location on either of a suction side or a pressure side of the rotor blade. Further, the flexible template has a plurality of hole locations, with each hole location corresponding to an attachment location for one of the surface features. The method also includes applying a first attachment feature around an outer periphery of each of the hole locations. Further, the method includes applying a second attachment feature within the first attachment feature, the second attachment feature being spaced from the first attachment feature in a center of the hole location. In addition, the method includes removing the flexible template from the rotor blade and securing at least one of the plurality of surface features at each of the attachment locations via the first and second attachment features.

In one embodiment, the first and second attachment features may include an adhesive or a double-side tape. In certain embodiments, the double-side tape includes an inner acrylic foam layer disposed between a first outer adhesive layer and a second outer adhesive layer. In such embodiments, the first attachment feature may include the double-sided tape, whereas the second attachment feature may include the adhesive or vice versa.

Alternatively, in further embodiments, the first attachment feature may include a tinted adhesive. In such embodiments, the step of applying the first attachment feature may include spraying the tinted adhesive at each of the hole locations and securing at least one of the plurality of surface features at each of the attachment locations marked by the tinted adhesive.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
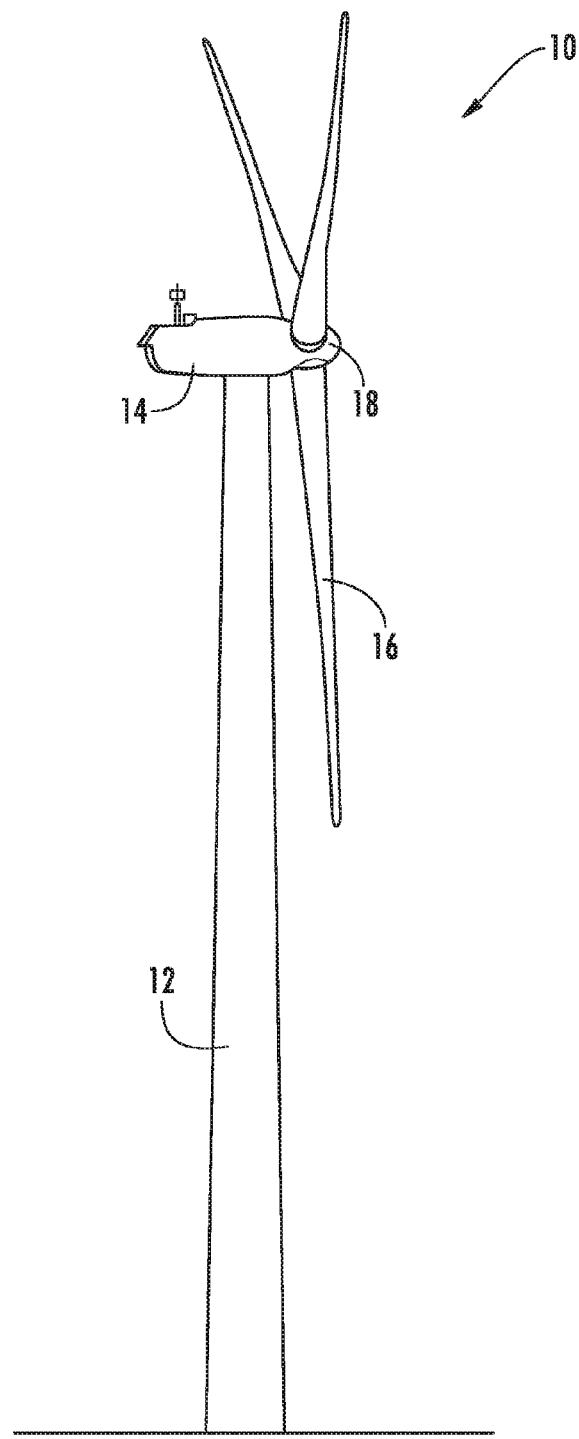
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the figures, FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft (not shown). The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
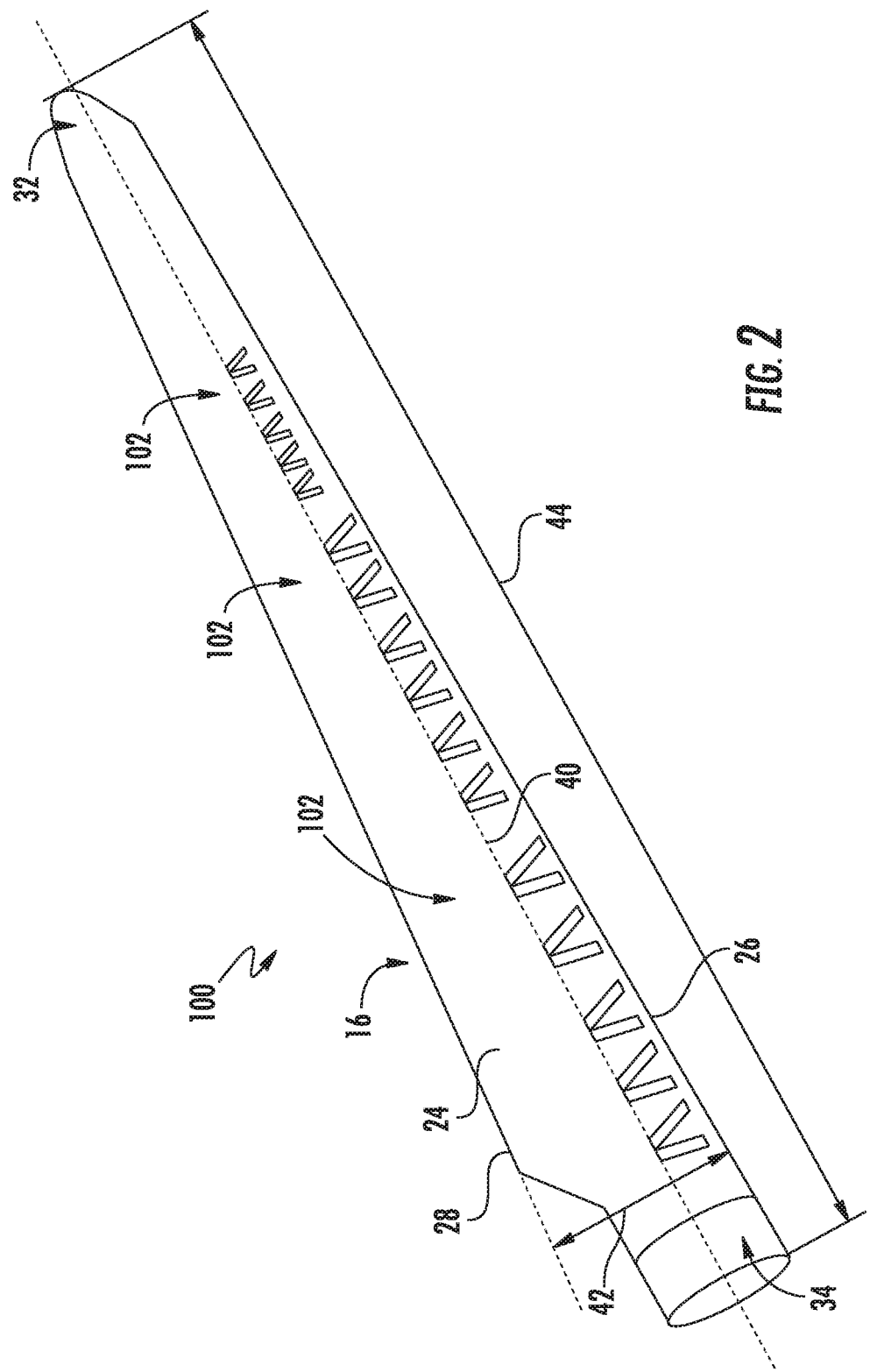
FIG. 2 illustrates a perspective view of one embodiment of a rotor blade assembly according to the present disclosure.

Referring to FIG. 2, a rotor blade assembly 100 in accordance with aspects of the invention is illustrated. As shown, the rotor blade assembly 100 includes a rotor blade 16 having surfaces defining pressure and suction sides 22, 24 extending between a leading edge 26 and a trailing edge 28. Further, the rotor blade 16 may extend from a blade tip 32 to a blade root 34. The surfaces defining the pressure side 22, the suction side 24, the leading edge 26, and the trailing edge 28 further define a rotor blade interior or cavity. Further, the rotor blade 16 defines a chord 42 and a span 44. As shown, the chord 42 may vary throughout the span 44 of the rotor blade 16. Thus, a local chord may be defined for the rotor blade 16 at any point on the rotor blade 16 along the span 44.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

In further embodiments, the rotor blade 16 may be curved. Curving of the rotor blade 16 may entail bending the rotor blade 16 in a generally flap-wise direction and/or in a generally edgewise direction. The flap-wise direction may generally be construed as the direction (or the opposite direction) in which the aerodynamic lift acts on the rotor blade 16. The edgewise direction is generally perpendicular to the flap-wise direction. Flap-wise curvature of the rotor blade 16 is also known as pre-bend, while edgewise curvature is also known as sweep. Thus, a curved rotor blade 16 may be pre-bent and/or swept. Curving may enable the rotor blade 16 to better withstand flap-wise and edgewise loads during operation of the wind turbine 10, and may further provide clearance for the rotor blade 16 from the tower 12 during operation of the wind turbine 10.

Still referring to FIG. 2, the rotor blade 16 defines a pitch axis 40 relative to the rotor hub 18. For example, the pitch axis 40 may extend generally perpendicularly to the rotor hub 18 and blade root 34 through the center of the blade root 34. A pitch angle or blade pitch of the rotor blade 16, i.e., an angle that determines a perspective of the rotor blade 16 with respect to the air flow past the wind turbine 10, may be defined by rotation of the rotor blade 16 about the pitch axis 40.

FIG. 2 further depicts a plurality of surface features 102 located on the suction side 24 of the rotor blade 16 along the span 44 thereof. More specifically, in the illustrated embodiment, the surface features 102 are configured in pairs to define generally V-shaped formations oriented towards the leading edge 26 of the rotor blade 16. In further embodiments, the surface features 102 may be arranged in any suitable formation in addition to the V-shaped formation.

Further, it should be understood that the surface features 102 are depicted on the suction side surface 24 of the blade 16 for illustrative purposes only and may also be provided on the pressure side surface 22. For example, in additional embodiments, the surface features 102 may be placed at any location on either or both of the flow surfaces 22, 24 of the rotor blade 16 wherein it is desired to modify the aerodynamic characteristics of the surface. In a particular embodiment, the surface features 102 may each have different sizes and/or configurations depending on their span-wise location on the rotor blade 16. Moreover, as shown in FIG. 2, there are three groupings of surface features 102, with the grouping closest to the blade root 34 being larger (or having an overall different shape or configuration) as compared to the adjacent groupings. In alternate embodiments, all of the surface features 102 may be disposed closer to a tip portion 32 of the blade 15 as compared to a root portion 34, or closer to the root portion 34 as compared to the tip portion 32. It should be understood that the invention is not limited to any particular placement of the surface features 102 on either or both flow surfaces 22, 24 of the blade 16.

Figure 3:
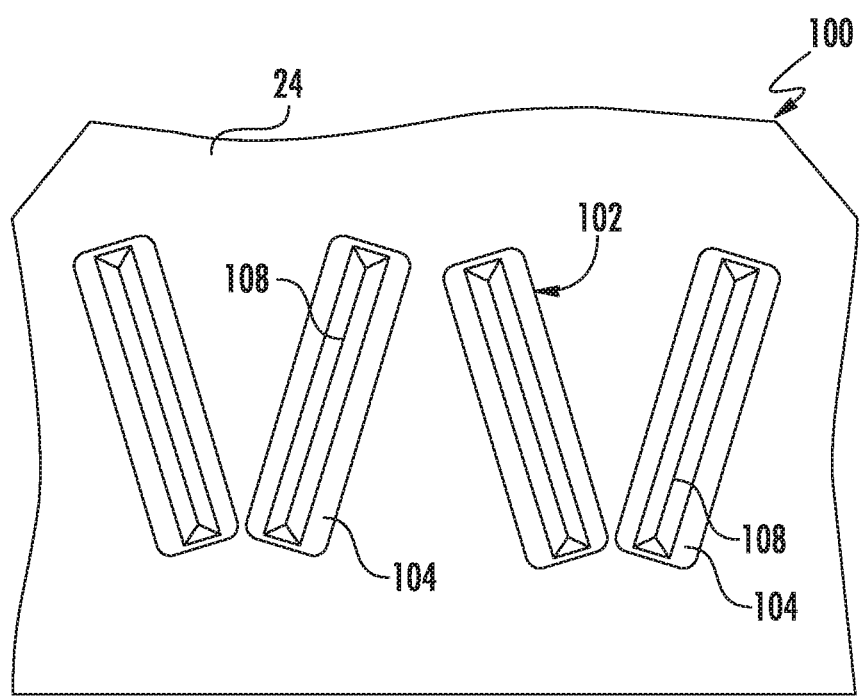
FIG. 3 illustrates a partial top view of another embodiment of a rotor blade assembly according to the present disclosure, particularly illustrating a plurality of surface features.

It should also be appreciated that the surface features 102 described herein may have different shape configurations within the scope and spirit of the invention. For example, as shown in FIG. 3, the surface features 102 of the present disclosure may include vortex generators having a fin-type protrusion configuration that is used for illustrative purposes only. As such, any type of protrusion serving as a flow disrupter for improving the aerodynamic efficiency of the rotor blade 16 is within the scope of the invention. More specifically, as shown, the surface features 102 of the present disclosure may include a base portion 104 and a protrusion member 108 extending upwardly from the base portion 104. As such, the base portion 104 generally defines a generally continuous structure that presents a surface that contours and adheres to the mating blade surface 24, whereas the protrusion member 108 generally disrupts the airflow across the blade surface.

Referring now to FIGS. 4-14, the present disclosure is directed to various methods for attaching such surface features 102 to the rotor blade 16. More specifically, in certain embodiments, the present disclosure is directed to various manufacturing and attachment methods for generally small blade add-on features, such as boundary layer energizers and small vortex generators that are useful for increased AEP applications and/or other performance gains.

Figure 4:
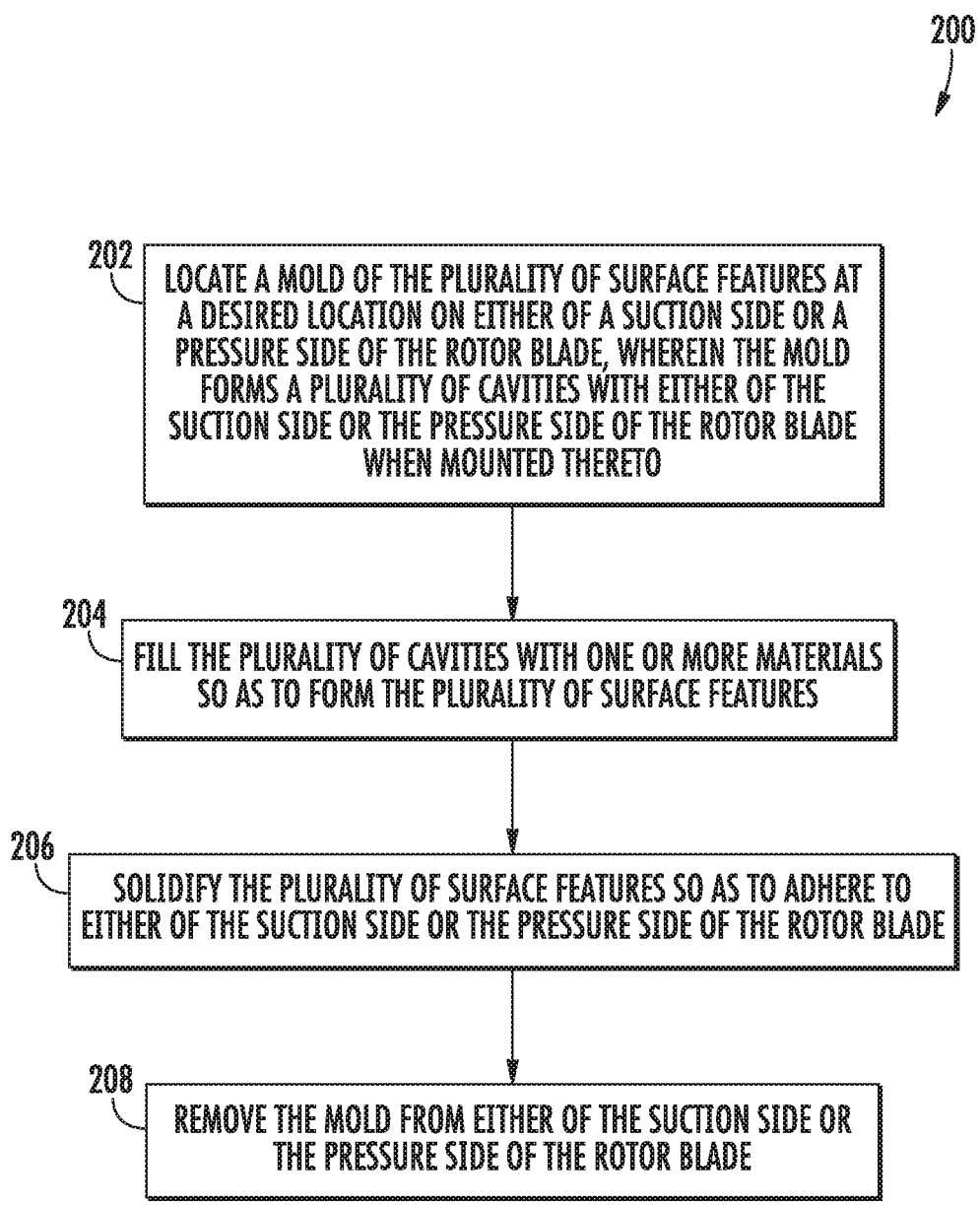
FIG. 4 illustrates a flow diagram of one embodiment of a method for attaching a plurality of surface features to a rotor blade according to the present disclosure.
Figure 5:
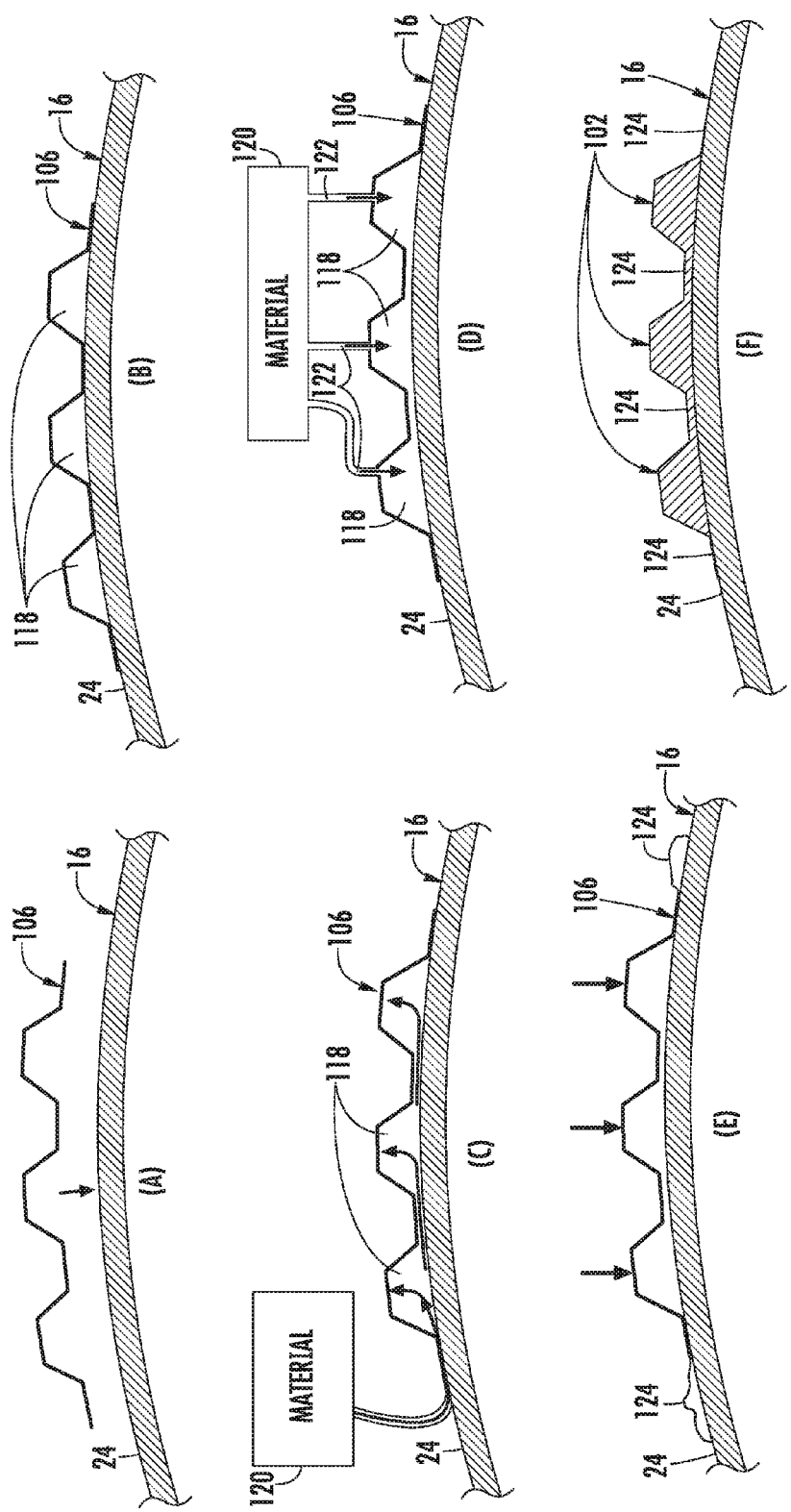
FIG. 5 illustrates a schematic process flow diagram of one embodiment of a method for attaching a plurality of surface features to a rotor blade according to the present disclosure.

Referring particularly to FIGS. 4 and 5, one embodiment of the present disclosure is directed to a method 200 for forming and attaching a plurality of the surface features 102 onto a rotor blade of a wind turbine, such as the rotor blade 16 of FIG. 2, via direct molding. As shown at 202, the method 200 includes locating a mold 106 of the plurality of surface features 102 at a desired location on either of the suction or pressure sides 22, 24 of the rotor blade 16. For example, as shown in FIG. 5(A), the mold 106 is placed on the suction side 24 of the rotor blade 16. Thus, as shown in FIG. 5(B), the mold 106 forms one or more cavities 118 with the suction side 24 of the rotor blade 16 when mounted thereto. As described herein, the mold 106 may be constructed of a flexible material. For example, in certain embodiments, the flexible material of the mold 106 may include any flexible polymer such as rubber, silicone, or combinations thereof. More specifically, in one embodiment, the mold 106 may be a silicone rubber mold that is relatively non-stick, thereby providing a mold that is easy to remove from the cured components. In addition, the mold 106 may be constructed of a transparent material that allows a user to see when the cavities 118 are completely filled.

Thus, as shown at 204, the method 200 includes filling the cavities 118 of the mold 106 with one or more materials 120 so as to form the plurality of surface features 102. More specifically, as shown in FIG. 5(C), the step of filling the cavities 118 with the one or more materials 120 may include placing (e.g. by injecting) the one or more materials 120 into a first side of the mold 106. For example, in certain embodiments, the one or more materials 120 may be injected into the cavities 118 of the mold 106 via at least one of vacuum infusion or pressure injection. In such embodiments, as shown, the material(s) 120 (e.g. a resin material) is allowed to flow into each of the plurality of cavities 118 from the injection point. In alternative embodiments, as shown in FIG. 5(D), each of the cavities 118 may include at least one opening 122. In such embodiments, the step of filling the cavities 118 with the one or more materials 120 may include separately placing the one or more materials 120 into each of the openings 122. In another embodiment, as shown in FIGS. 5(E) and 5(F), the method 200 may also include applying pressure to the mold 106 after filling the cavities 118 with the one or more materials 120 so as to squeeze out excess material 124.

In certain embodiments, the one or more materials 120 may include a thermoset material, a thermoplastic material, rubber, a reinforcement material, a putty, or combinations thereof. More specifically, the one or more materials 120 may include a fast-setting thermoset material. The thermoset materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material. More specifically, the material(s) 120 may include any compound of two or more liquid- and/or putty-based thermoset compounds. In addition, the material(s) 120 may include one or more fillers (such as glass fiber).

The thermoplastic materials as described herein generally encompass a plastic material or polymer that is reversible in nature. For example, thermoplastic materials typically become pliable or moldable when heated to a certain temperature and return to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the reinforcement material(s) as described herein may generally encompass one or more fiber materials including but not limited to glass fibers, carbon fibers, polymer fibers, ceramic fibers, nanofibers, metal fibers, or similar.

Referring back to FIG. 4, as shown at 206, the method 200 further includes curing the plurality of surface features 102 such that the features 102 adhere to either of the suction or pressure sides 22, 24 of the rotor blade 16. For example, it should be understood that the curing step creates a bond between the surface features 102 and the rotor blade 16. Moreover, as shown at 208, the method 200 includes removing the mold 106 from either of the suction or pressure sides 22, 24 of the rotor blade 16 after the surface features 102 have cured. For example, FIG. 5(F) illustrates the rotor blade 16 wherein the mold 106 has been removed and the surface features 102 are directly molded to the suction side 24 of the rotor blade 16.

In another embodiment, the method 200 may also include removing the excess material 124 from the rotor blade 16, i.e. at the edges of the mold 106 (FIG. 5(E)) and/or between the surface features 102 (FIG. 5(F)) either before or after curing the surface features 102 to the rotor blade 16. More specifically, in certain embodiments, the excess material 124 may be removed by hand, via a squeegee, or by any other suitable means.

Figure 6:
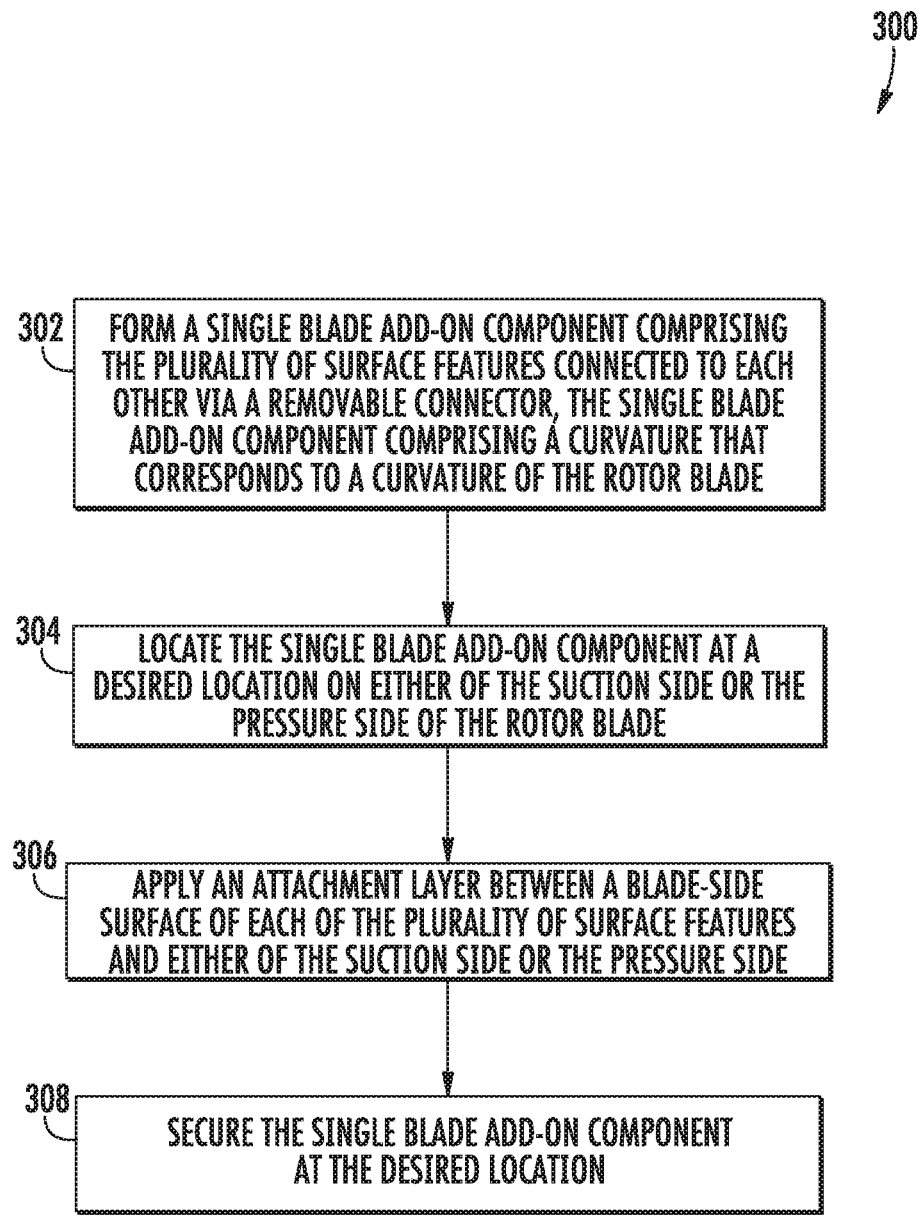
FIG. 6 illustrates a flow diagram of another embodiment of a method for attaching a plurality of surface features to a rotor blade according to the present disclosure.
Figure 7:
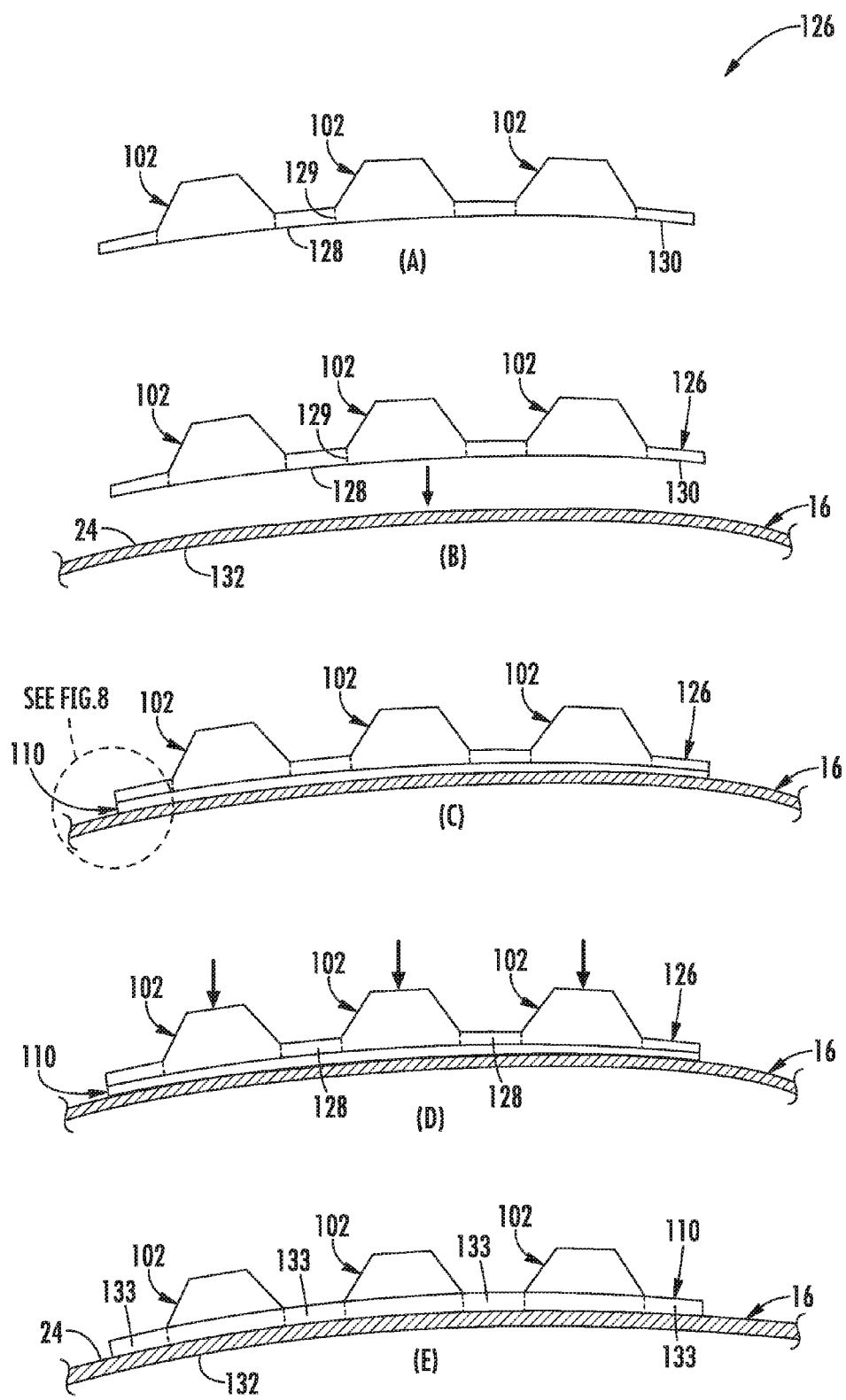
FIG. 7 illustrates a schematic process flow diagram of another embodiment of a method for attaching a plurality of surface features to a rotor blade according to the present disclosure.

Referring now to FIGS. 6 and 7, another embodiment of the present disclosure directed to a method 300 for attaching the surface features 102 to the rotor blade 16 is illustrated. As shown at 302, the method 300 includes forming a single blade add-on component 126 containing the plurality of surface features 102 connected to each other via a removable connector 128, e.g. an array of connected parts. More specifically, as shown in FIG. 7(A), each of the surface features 102 of the blade add-on component 126 are connected together via connectors 128 joined by lines of perforation 129. Further, in one embodiment, the method 300 may include forming the single blade add-on component 126 from a thermoset material, such as the thermoset materials described herein. In another embodiment, the method 300 may include forming the single blade add-on component 126 via at least one of injection molding, three-dimensional (3D) printing, thermoforming, vacuum forming, or vacuum infusion.

Further, as shown in FIGS. 7(A) and 7(B), the single blade add-on component 126 may be formed with a curvature 130 that corresponds to a curvature 132 of the rotor blade 16 at one or more locations thereof. Thus, as shown at 304, the method 300 further includes locating the single blade add-on component 126 at a desired location on either of the suction side 24 or the pressure side 22 of the rotor blade 16. More specifically, the single blade add-on component 126 may be located at a location where the curvature 130 of the component 126 generally matches the curvature 132 of the rotor blade 16. For example, as shown in FIG. 7(B), the single blade add-on component 126 is located on the suction side 24 of the rotor blade 16 where the curvatures 130, 132 substantially match.

Figure 8:
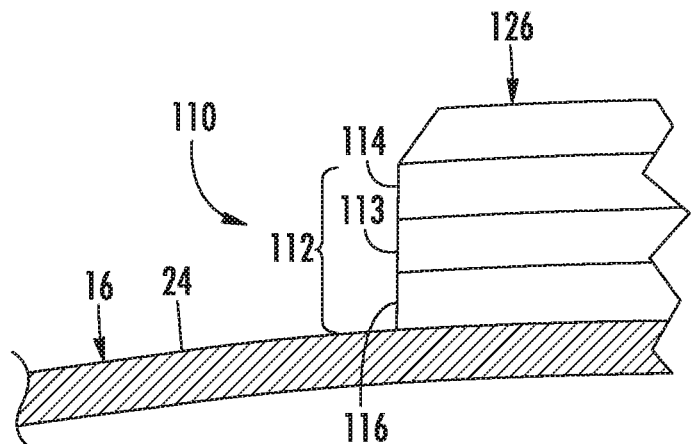
FIG. 8 illustrates a detailed cross-sectional view of one embodiment of a surface feature attached to a rotor blade via an attachment layer according to the present disclosure.

As shown at 306, the method 300 also includes applying an attachment layer 110 between a blade-side surface of the blade add-on component 126 and either of the suction side 24 or the pressure side 22 of the rotor blade 16. For example, as shown in FIGS. 7(C) and 8, the attachment layer 110 may be a double-sided adhesive sheet or tape material 112, such as a Very High Bond (VHB)/SAFT (Solar Acrylic Foam Tape) foam-based tape. Various examples of VHB/SAFT foam-based materials are commercially available, for example from 3M Corporation of St. Paul, Minn., USA. Further, as shown in FIG. 8, the double-sided tape 112 may have an inner acrylic foam layer 113 disposed between a first outer adhesive layer 114 and a second outer adhesive layer 116.

Figure 9:
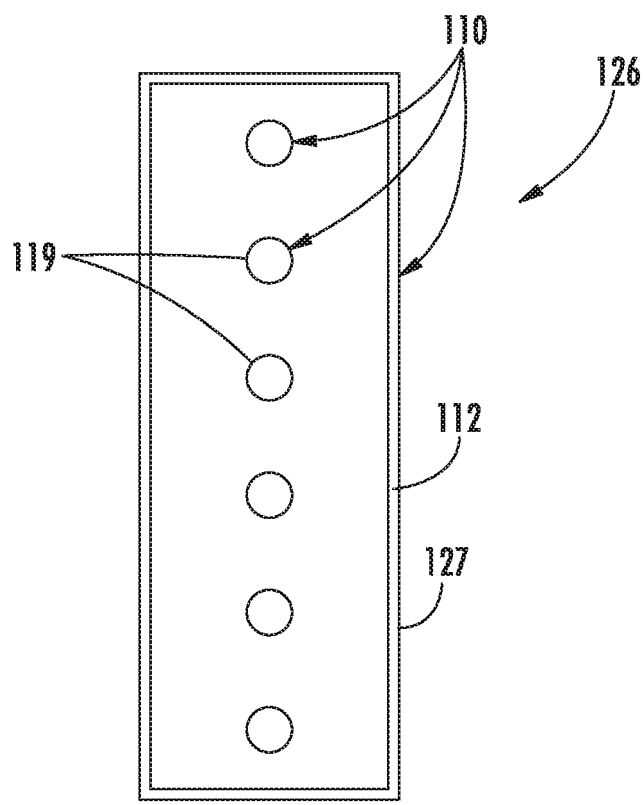
FIG. 9 illustrates a blade-side surface of one embodiment of a single blade add-on component according to the present disclosure, particularly illustrating first and second attachment features configured thereon.

In further embodiments, the attachment layer 110 as described herein may be applied as a continuous strip between the blade add-on component 126 (or any surface feature 102 described herein) and the underlying blade surface 24 (e.g. as shown in FIG. 7), or may be applied in a discontinuous pattern. In additional embodiments, as shown in FIG. 9, the attachment layer 110 may include the double-faced adhesive tape 112 around the periphery 127 of the blade add-on component 126 or surface feature 102 and an adhesive 119 in a center portion thereof. As such, the tape 112 may provide a sealed surface to prevent squeeze out of the adhesive 119 when the surface feature 102 is applied to the blade surface and/or when adhesive is injected in between the surface feature 102 and rotor blade 16. Though the illustrated embodiment depicts the adhesive 119 configured in the center portion of the blade add-on component 126 as generally circular dots, it should be understood that any configuration of adhesive may be further utilized in additional embodiments in combination with the double-side tape 112.

Figure 10:
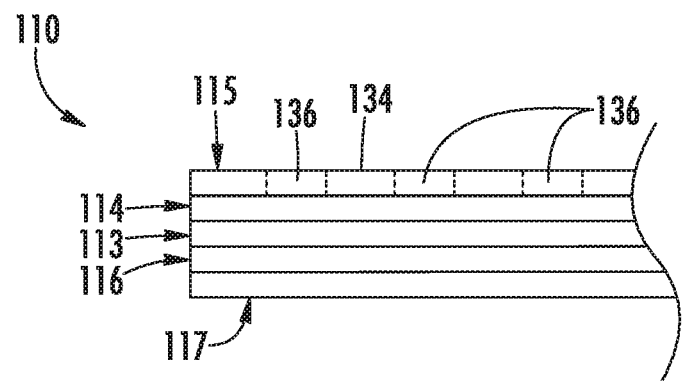
FIG. 10 illustrates a detailed cross-sectional view of one embodiment of an attachment layer for a surface feature of a rotor blade according to the present disclosure.
Figure 11:
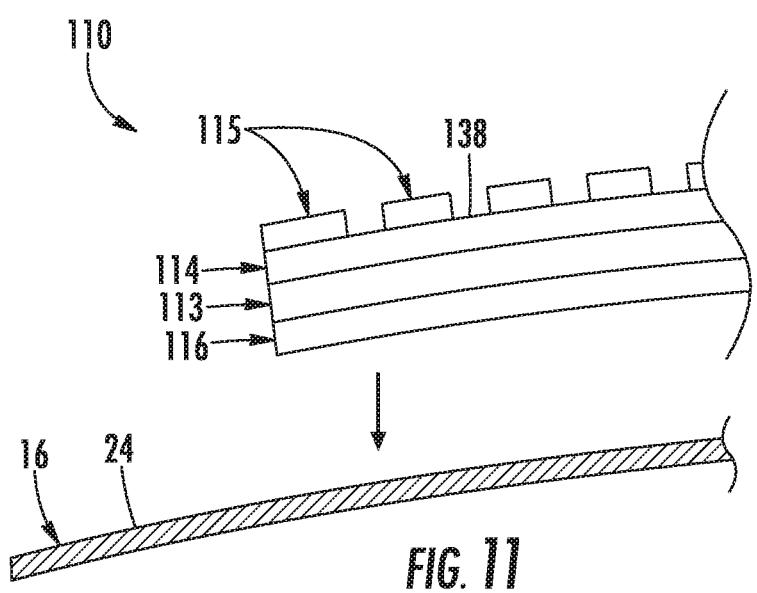
FIG. 11 illustrates a detailed cross-sectional view of the attachment layer of FIG. 10 being located on the rotor blade according to the present disclosure.

Referring now to FIGS. 10 and 11, the step of applying the attachment layer 110 between the blade-side surface of blade add-on component 126 or surface feature 102 and either of the suction side 24 or the pressure side 22 may include cutting a predetermined pattern 134 (as indicated by the dotted lines) into a first liner cover 115 of the first outer adhesive layer 114. For example, in certain embodiments, the double-sided tape 112 may be die cut or laser cut. Thus, the method 300 may further include selectively removing cut portions 136 of the first liner cover 115 from atop of the first outer adhesive layer 114 corresponding to the predetermined pattern 134 to expose portions of the first outer adhesive layer 114 (FIG. 11). As such, the predetermined pattern 134 is configured to set the part location and enable selective liner removal and tape removal as desired. The method 300 may also include removing the second liner cover 117 from the second outer adhesive layer 116 and securing the second outer adhesive layer 116 to either of the suction side 24 or the pressure side 22 of the rotor blade 16. As such, the surface features 102 and/or the blade add-on component 126 of the present disclosure can be secured to the exposed portions 138 of the first outer adhesive layer 114. In additional embodiments, once the tape 112 and surface features 102 have been applied to the blade 16, the method 300 may also include removing the excess tape 112 with the liner(s) still intact. Thus, it should be understood that cutting the attachment layer 110 as described above so as to locate and attach the surface features 102 on the rotor blade 16 may be completed alone or in combination with any of the additional attachment methods as described herein.

Referring back to FIG. 6, as shown at 308, the method 300 may also include securing the single blade add-on component 126 or surface feature 102 at the desired location. For example, as shown in FIG. 7(D), the step of securing the single blade add-on component 126 at the desired location may further include applying pressure to each of the plurality of surface features 102 so as to allow the attachment layers 110 to bond to the rotor blade 16.

In additional embodiments, as shown in FIGS. 7(D) and 7(E), the method 300 may include removing one or more of the connectors 128 from between the plurality of surface features 102 after securing the single blade add-on component 126 at the desired location. For example, in certain embodiments, the connectors 128 may be removed along the lines of perforation 129. Further, as shown in FIG. 7(E), the method 300 may include removing portions 133 of the attachment layer 110 from between the plurality of surface features 102 either before or after securing the single blade add-on component 126 at the desired location.

Figure 12:
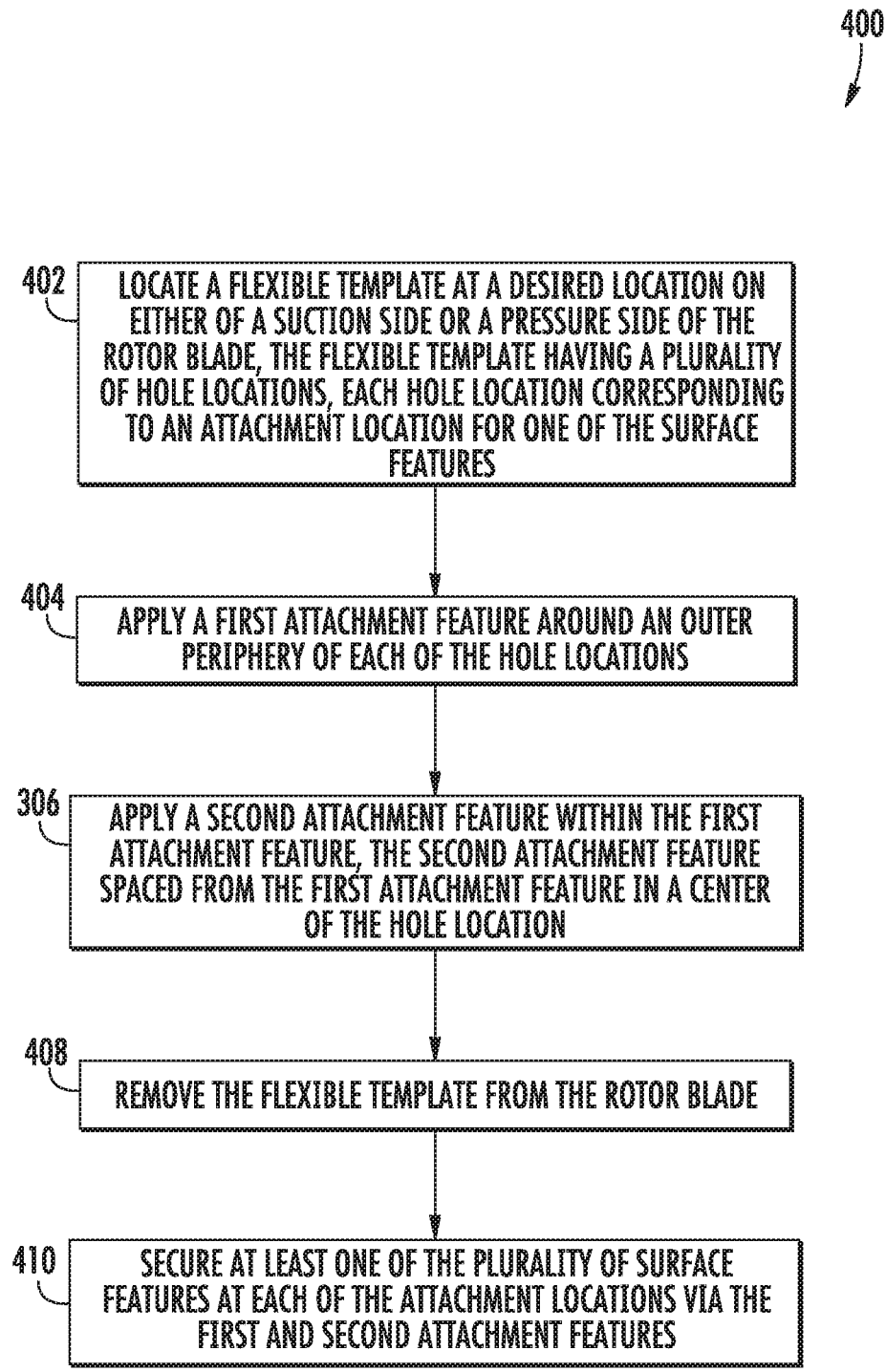
FIG. 12 illustrates a flow diagram of yet another embodiment of a method for attaching a plurality of surface features to a rotor blade according to the present disclosure.
Figure 13:
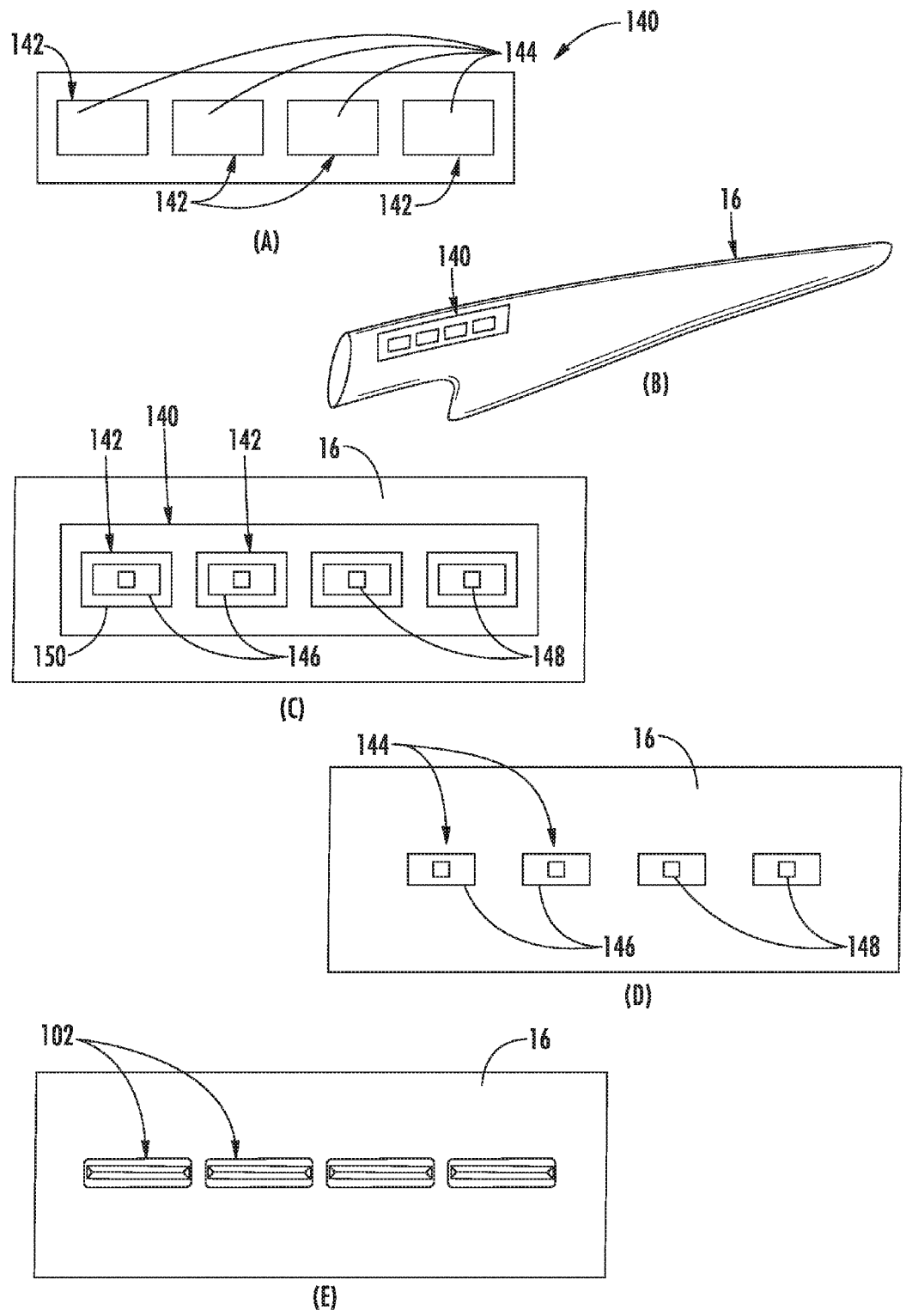
FIG. 13 illustrates a schematic process flow diagram of yet another embodiment of a method for attaching a plurality of surface features to a rotor blade according to the present disclosure.

Referring now to FIGS. 12 and 13, yet another embodiment of a method 400 for attaching the surface features 102 to the rotor blade 16 is illustrated. As shown at 402 of FIG. 12 and FIG. 13(B), the method 400 includes locating a flexible template 140 at a desired location on either of the suction side 24 or the pressure side 22 of the rotor blade 16. More specifically, as shown in FIG. 13(A), the flexible template 140 has a plurality of hole locations 142, with each hole location 142 corresponding to an attachment location 144 for one of the surface features 102 as described herein. As shown at 404, the method 400 includes applying a first attachment feature 146 (e.g. the double-sided tape 112) around an outer periphery 150 of each of the hole locations 142. As shown at 406, the method 400 includes applying a second attachment feature 148 (e.g. the adhesive 119) within the first attachment feature 146. For example, as shown in FIG. 13(C), the first attachment feature 146 may be placed around the outer periphery 150 of each hole location 142, with the second attachment feature 138 spaced from the first attachment feature 146 in a center thereof. As shown at 408, the method 400 includes removing the flexible template 140 from the rotor blade 16. For example, FIG. 13(D) illustrates the first and second attachment features 146, 148 located on the rotor blade 16 with the template 140 removed therefrom.

Referring still to FIG. 12, as shown at 410, the method 400 includes securing at least one of the surface features 102 at each of the attachment locations 144 via the first and second attachment features 146, 148. For example, as shown in FIGS. 13(D) and (E), the surface features 102 may first be secured to the rotor blade 16 via the double-side tape 112 (i.e. first attachment feature 146) and further secured by the adhesive 119 (i.e. second attachment feature 148) as the adhesive cures to the surface features 102.

As mentioned, the step of applying the first and second attachment features 146, 148 may also include cutting a predetermined pattern into the first liner cover 115 of the first outer adhesive layer 114, selectively removing cut portions of the first liner cover 115 from the first outer adhesive layer 114 corresponding to the predetermined pattern 134 to expose portions of the first outer adhesive layer 114 for attachment of the plurality of surface features 102, removing a second liner cover 117 from the second outer adhesive layer 116, and securing the second outer adhesive layer 116 to the rotor blade 16.

Figure 14:
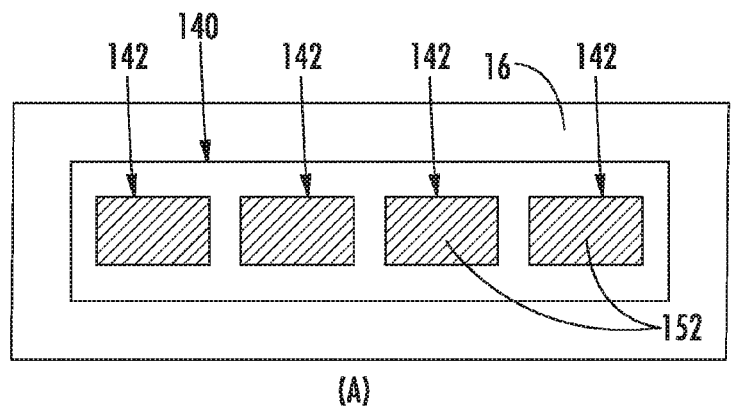
FIG. 14 illustrates a schematic process flow diagram of still another embodiment of a method for attaching a plurality of surface features to a rotor blade according to the present disclosure.
Figure 14:
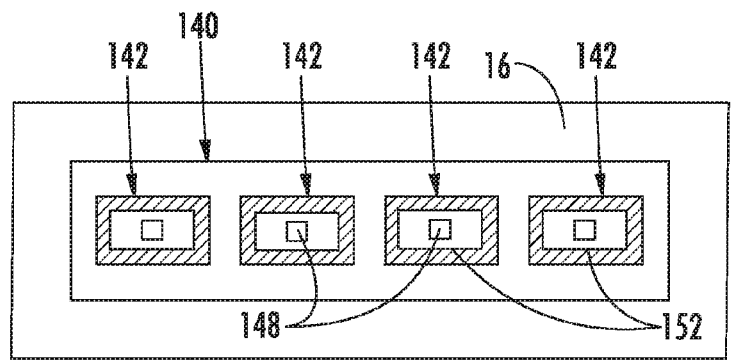
Figure 14:
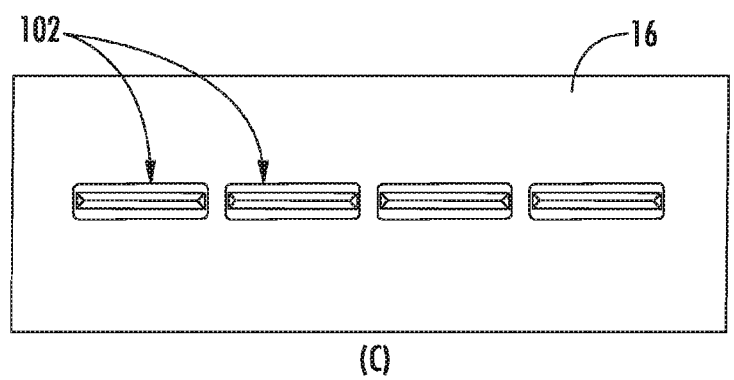

Alternatively, as shown in FIG. 14, the first and/or second attachment features 146, 148 may correspond to a tinted adhesive 152. For example, in one embodiment, the first attachment feature 146 may correspond to a tinted adhesive 152. Thus, as shown, the hole locations 142 may be marked by spraying the tinted adhesive 152 at each of the hole locations 142 and securing at least one of the plurality of surface features 102 at each of the attachment locations 144 marked by the tinted adhesive 152. More specifically, as shown, the tinted adhesive 152 may cover all (FIG. 14(A)) or a portion (FIG. 14(B)) of each hole location 102. For example, as shown in FIG. 14(B), the spray pattern can be such that the adhesive pattern covers only the outer perimeter of each hole location 142 and a separate amount of a different adhesive (labeled second attachment feature 146) can be applied in the center of each hole location 142 before the surface features 102 are attached thereto. Once the attachment locations 144 are marked, as mentioned, the method 400 further includes securing at least one of the surface features 102 thereto.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for forming and attaching a plurality of surface features onto a rotor blade of a wind turbine, the method comprising:
    locating a mold of the plurality of surface features at a desired location on either of a suction side or a pressure side of the rotor blade, the mold forming a plurality of cavities with either of the suction side or the pressure side of the rotor blade, each of the plurality of cavities comprising at least one opening;
    vacuum drawing one or more liquid resin materials into each of the plurality of cavities through the openings so as to form the plurality of surface features;
    solidifying the plurality of surface features so as to adhere to either of the suction side or the pressure side of the rotor blade; and,
    removing the mold from either of the suction side or the pressure side of the rotor blade.

2. The method of claim 1, further comprising applying pressure to the mold before; during, and/or after filling the plurality of cavities with the one or more materials.

3. The method of claim 1, further comprising removing excess solidified material.

4. The method of claim 1, wherein the mold is constructed of a flexible material.

5. The method of claim 4, wherein the flexible material of the mold comprises at least one of rubber, silicone, or combinations thereof.

6. The method of claim 1, wherein the one or more liquid resin materials comprise at least one of a thermoset material or a thermoplastic material, or combinations thereof.

* * * * *